(12) United States Patent
Harris et al.

(10) Patent No.: US 12,728,936 B2
(45) Date of Patent: Sep. 8, 2026

(54) BED MOUNTED TIRE CARRIER WITH COMPLIANCE

(71) Applicant: TOYOTA MOTOR ENGINEERING & MANUFACTURING NORTH AMERICA, INC., Plano, TX (US)

(72) Inventors: Ryan C. Harris, Saline, MI (US); James Chung, Ypsilanti, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 317 days.

(21) Appl. No.: 18/412,108

(22) Filed: Jan. 12, 2024

(65) Prior Publication Data

US 2025/0229850 A1 Jul. 17, 2025

(51) Int. Cl.
*B62D 43/02* (2006.01)

(52) U.S. Cl.
CPC .................................... *B62D 43/02* (2013.01)

(58) Field of Classification Search
CPC ...... B62D 43/02; B62D 43/04; B62D 43/002; B60G 13/16; B60G 2202/25
See application file for complete search history.

(56) References Cited

U.S. PATENT DOCUMENTS

| | | | | |
|---|---|---|---|---|
| 3,554,415 | A * | 1/1971 | Woods | B62D 43/04 224/524 |
| 4,327,849 | A * | 5/1982 | Sharpton | B60K 15/06 224/532 |
| 4,377,366 | A * | 3/1983 | Hamlyn | B62D 43/045 414/466 |
| 5,186,371 | A * | 2/1993 | Jozefczak | B62D 43/002 414/463 |
| 5,333,766 | A * | 8/1994 | Fisher | B62D 43/02 224/42.28 |
| 6,941,802 | B2 * | 9/2005 | Brown | B60C 23/06 73/146 |
| 7,882,993 | B2 * | 2/2011 | McGuire | B62D 43/04 224/42.28 |
| 8,550,315 | B2 * | 10/2013 | Houser | B60G 13/16 224/538 |
| 9,828,045 | B1 | 11/2017 | Harris | |
| 2006/0108489 | A1 | 5/2006 | Hartgers | |

(Continued)

FOREIGN PATENT DOCUMENTS

| | | |
|---|---|---|
| CN | 218431460 U | 2/2023 |
| JP | 2007008371 A | 1/2007 |
| JP | 2023049351 A | 4/2023 |

*Primary Examiner* — Brian D Nash
(74) *Attorney, Agent, or Firm* — HAYNES AND BOONE, LLP

(57) ABSTRACT

The systems, devices, and methods described herein relate to a mounting system for a vehicle. The mounting system may be compliant such that it accommodates movement of the vehicle during off road driving or other activities involving vehicle articulation. The movement of the mounting system may be provided by joint structures including ball joints and sliding joints that allow limited movement of the mounting system during off road use without allowing movement during on road use to effectively secure cargo.

19 Claims, 7 Drawing Sheets

(56) References Cited

U.S. PATENT DOCUMENTS

| | | | | |
|---|---|---|---|---|
| 2016/0096408 | A1* | 4/2016 | Hicks | B62D 53/068 280/124.109 |
| 2017/0305218 | A1* | 10/2017 | Stanifer | B60D 1/015 |
| 2021/0237658 | A1* | 8/2021 | Wronski | B62D 43/02 |
| 2021/0284256 | A1* | 9/2021 | Mathews | B62D 43/02 |
| 2023/0001858 | A1* | 1/2023 | Greeno | B60R 9/06 |
| 2023/0091144 | A1* | 3/2023 | Heacock | B60R 9/06 224/42.26 |
| 2024/0123807 | A1* | 4/2024 | Hausler | B62D 21/02 |
| 2024/0400140 | A1* | 12/2024 | Vandervoord | B62D 33/027 |
| 2024/0425121 | A1* | 12/2024 | Mathews | B62D 43/002 |
| 2024/0425122 | A1* | 12/2024 | Prior | B62D 43/02 |
| 2025/0136006 | A1* | 5/2025 | Zylstra | B60J 7/1621 |

* cited by examiner

BED MOUNTED TIRE CARRIER WITH COMPLIANCE

TECHNICAL FIELD

The present disclosure is directed to systems, devices, and methods for mounting cargo on a vehicle. In particular, the present disclosure includes a compliant mounting solution for cargo that allows for movement of the mounting system relative to the vehicle during articulation.

BACKGROUND OF THE DISCLOSURE

Advances in vehicle capabilities has increasing allowed vehicles to access to new types of terrain. These advances often include new requirements for carrying and storing equipment. For example, even common passenger vehicles are required to carry a spare tire in case of a flat tire. The needs for one or more spare tires increase when driving on different types of terrain. This spare is typically mounted underneath the vehicle. For some pickup truck owners, it is preferred to have a tire carrier mounted in the bed of the pickup truck that can house one or multiple spare tires. Drivers do this for a variety of reasons, including making the spare more accessible, increasing the ground clearance in the rear of the truck by relocating the spare tire to the bed, adding space for additional spare tire in racing or off road applications, or allowing for oversized tires that may not fit beneath the vehicle.

However, existing bed mounting solutions for tires may pose the problem of adding rigidity to the rear deck and frame. This added rigidity reduces the amount of articulation that is possible when in off road situations and also causes larger inputs to the frame which may result in structural concerns over time. Mounting solutions for other specialized equipment required for traversing different types of terrain such as extra tires, recovery gear, tools, and survival gear also pose this same problem and do not accommodate movement due to vehicle articulation.

Therefore, need exist for compliant mounting solutions that are suitable for both on road and offroad use.

SUMMARY

In some exemplary aspects, the present disclosure introduces a mounting system for a vehicle, comprising: a base structure configured to be mounted rigidly to the vehicle, the base structure comprising a first rail and a second rail; a first slider joint disposed on the first rail; a second slider joint disposed on the second rail; a first ball joint disposed on the first slider joint; a second ball joint disposed on the second slider joint; a third rail extending between and in contact with both the first ball joint and the second ball joint; and a mounting structure disposed on the third rail, the mounting structure configured to carry cargo.

The mounting system may also include a third slider joint disposed on the first rail and a fourth slider joint disposed on the second rail. A third ball joint may be disposed on the third slider joint and a fourth ball joint disposed on the fourth slider joint. A fourth rail may extend between and in contact with both the third ball joint and the fourth ball joint, wherein the mounting structure is disposed on the fourth rail. The third rail may be positioned substantially perpendicular to the first rail and the second rail. The fourth rail may be positioned substantially perpendicular to the first rail and the second rail. The cargo may be a spare tire. The base structure may be configured to be mounted to the bed of the vehicle. A lock may be disposed on the first slider joint, the lock configured to inhibit movement of the slider joint when actuated.

A cargo mounting device for a vehicle is also provided, which may include: a first support rail with a first end and a second end configured to be mounted to a bed of the vehicle; a second support rail with a first end and a second end configured to be mounted to the bed of the vehicle; a third support rail extending between the first support rail and the second support rail; a fourth support rail extending between the first support rail and the second support rail; a first joint structure disposed on a proximal end of the third support rail and connected to the first support rail; a second joint structure disposed on a distal end of the third support rail and connected to the second support rail; a third joint structure disposed on a proximal end of the fourth support rail and connected to the first support rail; a fourth joint structure disposed on a distal end of the fourth support rail and connected to the second support rail; and a mounting structure configured to carry cargo, the mounting structure extending between the third support rail and the fourth support rail.

In some implementations, each of the first, second, third, and fourth joint structures comprises a sliding joint connected to a ball joint. The mounting structure may be configured to carry a spare tire. The mounting structure may be connected to a central portion of the third support rail and a central portion of the fourth support rail. The mounting structure may be rigidly attached to the third support rail and the fourth support rail. In some implementations, a first, second, third, and fourth lock may be disposed on the first, second, third, and fourth joint structures, respectively, wherein the first, second, third and fourth locks are configured to inhibit movement of the first, second, third, and fourth joint structures when actuated.

A method of installing a mounting structure on a vehicle is also provided, which may include: providing a base structure comprising a first rail and a second rail; providing a first slider joint and a second slider joint disposed on the first rail; providing a first ball joint disposed on the first slider joint and a second ball joint disposed on the second slider joint; providing a third rail extending between and in contact with both the first ball joint and the second ball joint; providing a mounting structure disposed on the third rail; rigidly mounting the base structure to the vehicle bed; and mounting cargo on the mounting structure.

In some implementations, the cargo is a spare tire. The method may include rigidly mounting the base structure to the vehicle bed at the opposite ends of the first and second rails. The method may include mounting the cargo on a central portion of the mounting structure. The mounting structure may be rigidly mounted to a central portion of the third rail.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes devices, systems, and methods for efficiently mounting cargo on a vehicle. In particular, the present disclosure provides for mounting solutions that are compliant during vehicle articulation and offroad movement to avoid vehicle damage and provide better articulation performance of the vehicle.

An exemplary mounting system includes rigidly mounted base structures and ball joints and slider joints that allow movement of the mounting system to accommodate articulation of the vehicle during off road driving.

Figure 1:
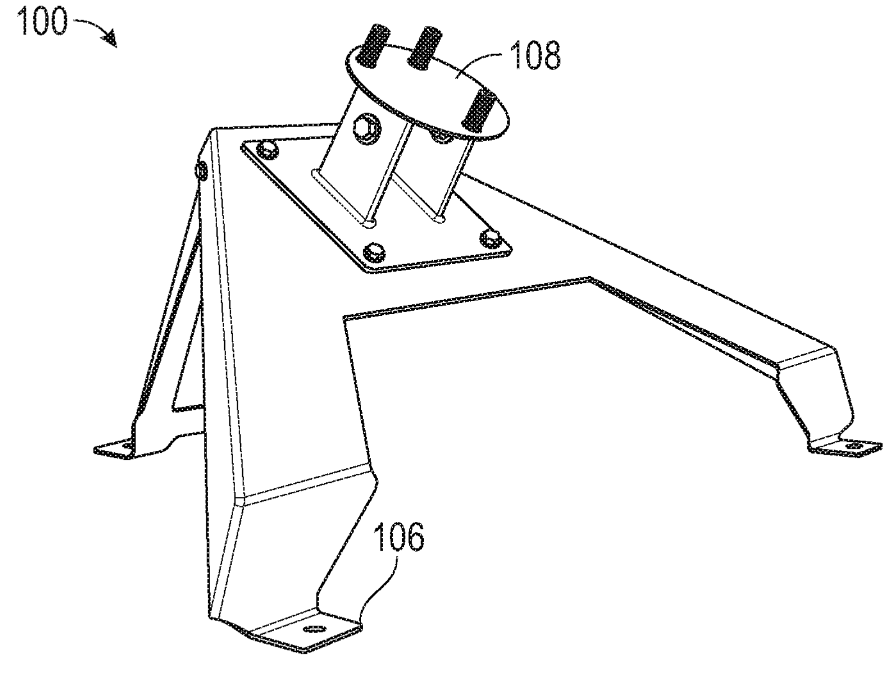
FIG. 1 is a diagram of an existing tire mounting device.
Figure 1:
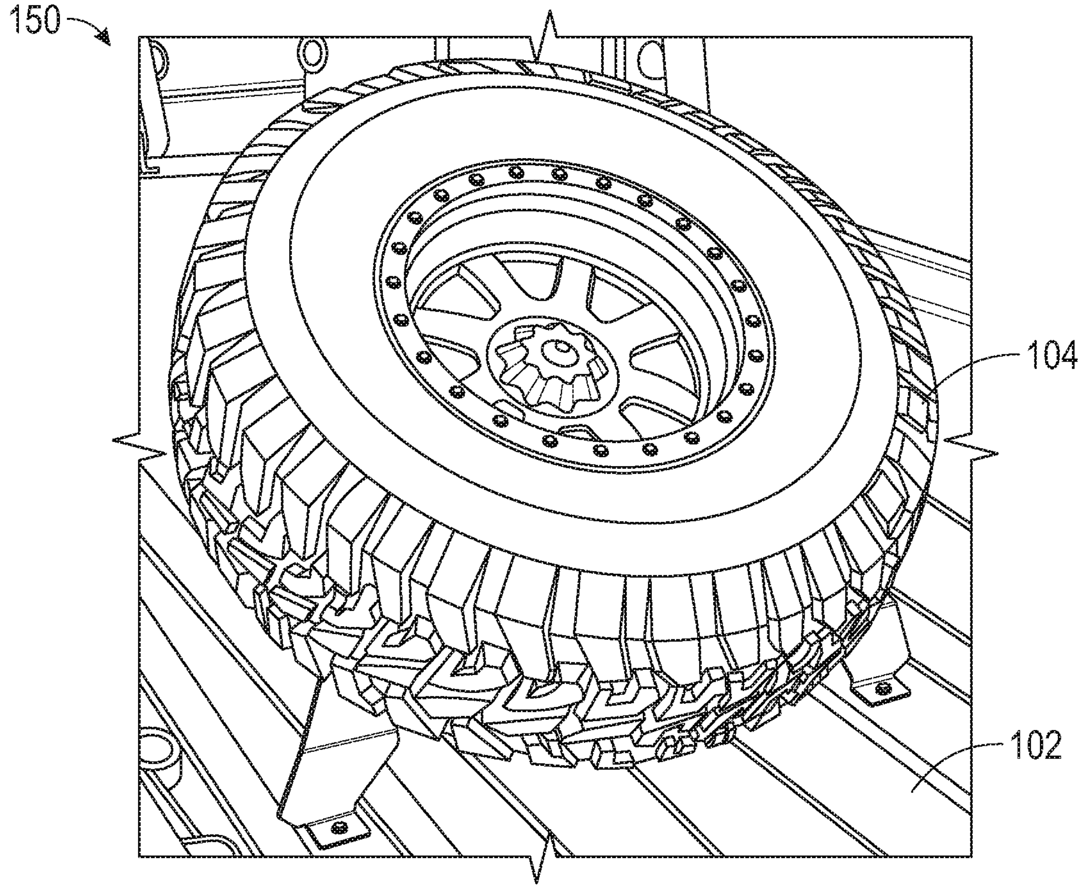

FIG. 1 shows a diagram of an existing tire mounting device 100. This device 100 is configured to be mounted in the bed 102 of a pickup truck and includes rigid mounts 106. The device 100 also includes a tire carrier assembly 108 for carrying a tire 104. The tire carrier assembly 108 is rigidly fixed to the mounts 106, such that the entire system is designed to inhibit movement of the mounting device 100 and tire 104. The rigid nature of the device 100 is problematic in that it adds rigidity to the bed 102 and frame of the vehicle. This added rigidity reduces the amount of articulation that is possible when in off road situations and causes larger inputs to the frame which may result in durability concerns with the vehicle structure.

Figure 2:
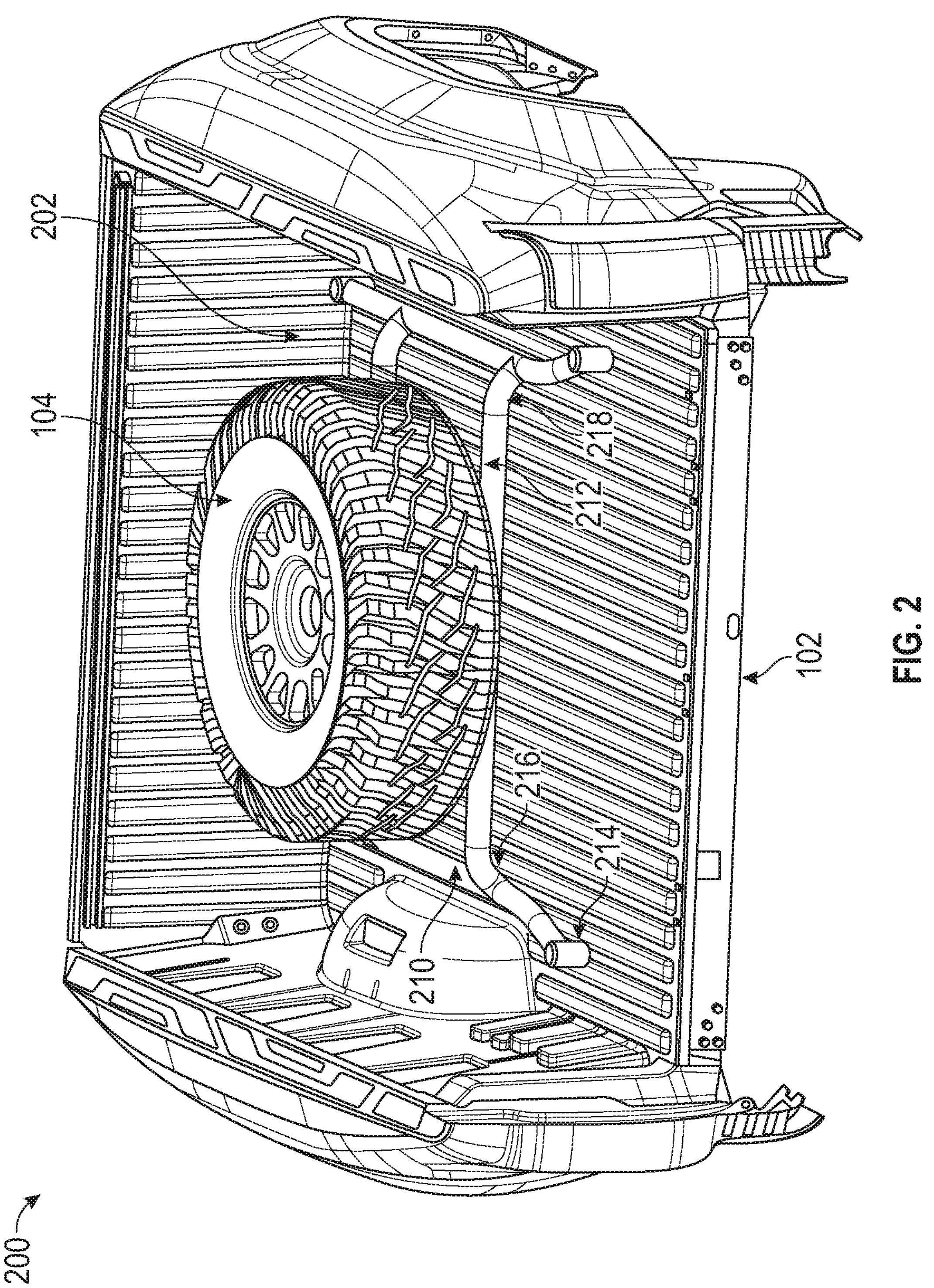
FIG. 2 is a diagram illustrating a cargo mounting system according to embodiments of the present invention.

In contrast to the rigid tire mounting device 100 of FIG. 1, the cargo mounting system 200 illustrated in FIG. 2 is compliant such that it accommodates articulation of the vehicle. The cargo mounting system 200 may include base structures 210, rails 212, and various joint structures such as slider joints 216 and ball joints 218. The base structures 210 may have a bar or tube shape and may be mounted securely to the vehicle via mounts 214. The rails 212 may extend between the base structures 210 and may include a mounting structure for carrying cargo such as a spare tire 104 and other types of cargo. The joint structures may allow the various components of the system 200 to move relative to each other as well as the vehicle during articulation.

Figure 3:
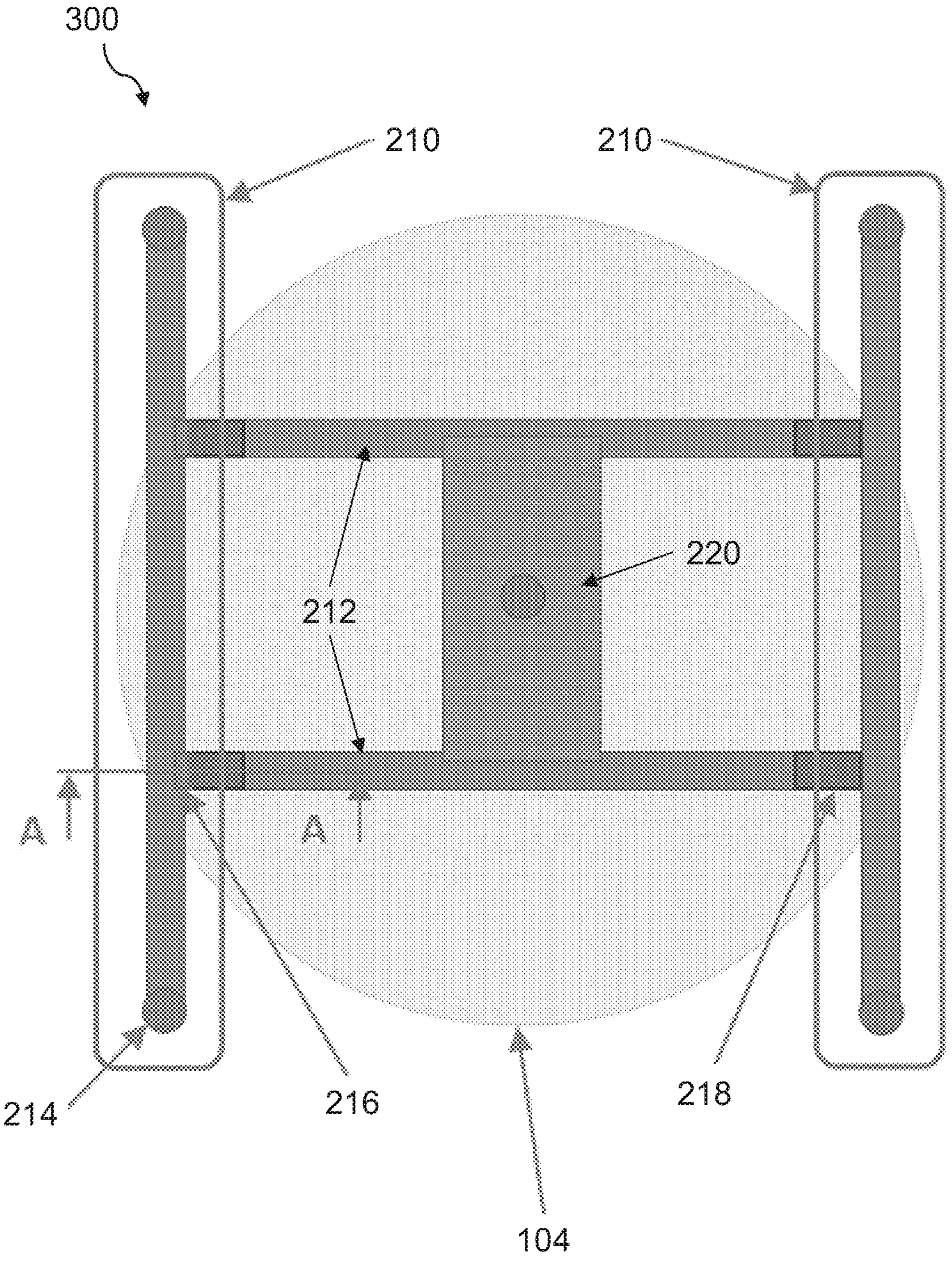
FIG. 3 is a diagram illustrating a cargo mounting system according to embodiments of the present invention.

FIG. 3 illustrates a diagram 300 showing a view from the underside of the cargo mounting system 200. The base structures 210 as shown are positioned roughly parallel to each other, while the rails 212 extend in a roughly perpendicular direction relative to the base structures 210. In some implementations, the base structures 210 and rails 212 are formed from metal such as steel, and may be formed in a rigid tube shape. The base structures 210 and rails 212 may include threaded portions, such as at the ends. The base structures 210 may be attached to a vehicle via mounts 214 disposed at the ends of the base structures 210. These mounts may include rigid metal portions which attach via bolts to the vehicle, such as to existing frame mounts. In the example of FIG. 3, four mounts 214 are shown, each disposed at an end of the base structure 210. However, different configurations may include more or less mounts, as well as further mounting locations. For example, the mounts 214 may be disposed at a central location of the base structures 210. The location of the mounts 214 may also be configured based on a certain vehicle model, for example, to match the frame mounts of a 2023 Toyota Tundra. The orientation of the base structures 210 may also vary depending on vehicle type and model. For example, the base structures 210 may be arranged to accommodate wheel wells, cargo tie downs, or other features.

In the example of FIG. 3, the rails 212 are attached to the base structures 210 via slider joints 216 and ball joints. The slider joints 216 may allow some movement in the vertical direction (i.e., away from the vehicle bed when mounted) and the ball joints 218 may allow some movement in all directions within a certain angular area. In the example of FIG. 3, the slider joints 216 are disposed between the base structures 210 and ball joints 218 on the left side of the diagram, while the ball joints 218 on the left side of the diagram 300 are connected directly to the base structures 210 and rails 212. This may allow for limited movement in the vertical direction without providing too much flexibility such that the cargo is not secure. Other configurations of joints are also contemplated. For example, each ball joint 218 may be connected to a slider joint 216. In another example, slider joints 216 are connected to ball joints 218 on the right side of the base rails 212 only. In yet another example, ball joints 218 diagonal from each other may be connected to slider joints 216. Connecting the slider joint directly to a ball joint may provide enough flexibility to accommodate articulation of the vehicle while minimizing the size of the cargo mounting system 200.

In all of these configurations, the cargo mounting system 200 may be configured to allow small amounts of movement during on road driving which will reduce fatigue and improve durability. During off road driving, the cargo mounting system 200 allows larger movements so as not to restrict the articulation or relative movement of the frame and other vehicle component. Thus, the cargo mounting system 200 allows movement when needed but is not overly loose during normal use.

The joint structures 210 may be configured to match the movement of the vehicle during articulation, such as during offroad driving. For example, the vehicle may traverse an area of rough terrain where one tire is elevated compared to the rest of the body. This elevation may also cause the frame to flex, and in particular, may cause part of the bed of the vehicle to also flex. A typical rigid spare tire mounting system such as that shown in FIG. 1, has the tendency to increase the rigidity of the bed of the vehicle. This may in turn reduce the amount of articulation possible by the vehicle. Reducing articulation can reduce offroad performance as well as cause issues with wear over time. For example, the mounts of a typical rigid spare tire system may cause damage to the vehicle bed as it articulates, and even the vehicle frame itself. The mounting system may also be damaged by the forces imparted by the vehicle. These problems are reduced greatly by the compliant nature of the present invention.

A cargo mounting structure 220 is also shown in FIG. 3, and may extend between the rails 212. In some implementations, the mounting structure 220 is affixed to a central portion of rails 212, such as being bolted or welded on. The mounting structure 220 may be configured to carry various types of cargo including one or more tires 104, off road equipment, a hi-lo jack, tools, overlanding supplies, water, provisions, and other types of cargo. The mounting structure 220 may include hardware such as bolts, straps, ties, screws, and other fastening mechanisms to secure the cargo to the mounting structure 220.

Figure 4:
FIG. 4 is a magnified, cross-sectional diagram along the line A-A in FIG. 3 illustrating a joint structure according to embodiments of the present invention.
Figure 4:
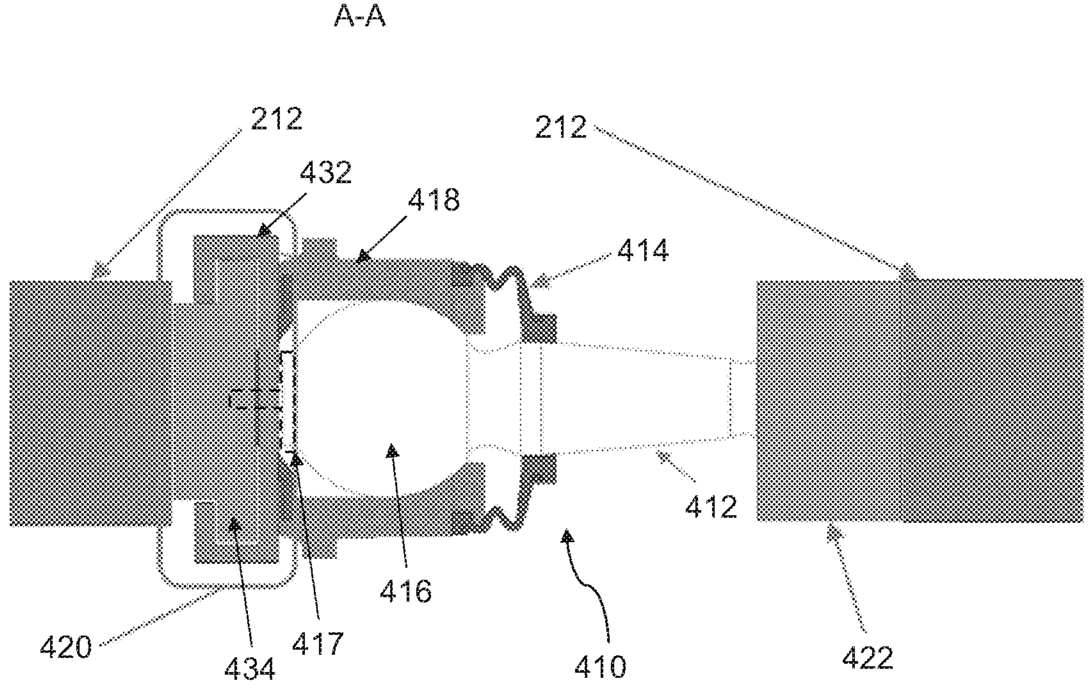

FIG. 4 is a magnified, cross-sectional diagram along the line A-A in FIG. 3, illustrating a joint structure 400 attached to rails 212. The joint structure 400 may include a ball joint 410 and a sliding joint 420. The ball joint 410 may be similar to the ball joints 218 and the sliding joint 420 may be similar to the sliding joints 216 shown in FIGS. 2 and 3. The ball joint 410 may include a tapered stud 412, a boot 414, a ball 416, and a socket 418. In some implementations, the tapered stud 412 and ball 416 are formed from metal. The socket 418 may also be formed from metal, such as hardened steel, and is configured to allow movement of the ball 416 within. The boot 414 may be formed from rubber, and may accommodate motion of the stud 412. The sliding joint 420 may include an outer housing 432 and a slider portion 434 disposed within the outer housing 432. One side of the rail 212 may be attached to the slider portion 434 and another side of the rail 212 may be attached to a threaded insert 422 which is attached to the tapered stud 412. The joints 410, 420 may be connected together with a pin, screw, bolt, or other type of connection. The joints 410, 420 may be rigidly connected together.

In some implementations, a driver is able to customize the number and capabilities of the joints 410, 420, thereby modifying the cargo mounting system 200 for a specific application. For example, the driver may be traveling on road for some time and may desire a more rigid mounting system that does not allow as much articulation. In this case, the driver may remove some or all of the joints (such as the sliding joints 410) such that the cargo mounting system 200 is more rigid. The driver may also modify the type of joints 410, 420 used (such as including more rigid joints for on road driving). In some implementations, the driver may accomplish this by simply detaching portions of the cargo mounting system 200 and re-attaching on the desired joint structure. This may be accomplished by including corresponding threaded portions on the joints 410, 420, rails 212, and base structures 210. In another example, a driver may be preparing the vehicle for use off road. The driver may modify the cargo mounting system 200 with more joints 410, 420 or more flexible joints to increase the compliance of the cargo mounting system 200. In this way, a driver may be able to match the flexibility of the cargo mounting system 200 with the expected amount of articulation that will be required for a certain type of driving.

In some implementations, locks 417 are implemented for some or all of the joints 410, 420 on the cargo mounting system 200 to completely or mostly inhibit movement of the joints 410, 420. For example, these locks may be actuated during normal on-road driving to prevent unwanted movement of the cargo and unlocked during off road driving to allow more articulation. In some implementations, the locks are only included on the slider joints 420. The locks 417 may include an easily accessible mechanism, such as quick release pin. In some implementations, the locks 417 are only included on the slider joints 420. The locks 417 may be configured to be easily accessible by a driver. For example, a user may be able to quickly access the locks 417 to actuate them, thereby reducing movement of the joints quickly after a session of offroad driving. Actuating the locks for on-road driving may increase the overall rigidity of the cargo mounting system 200. This may help to keep cargo securely fastened when actuation is not necessary or desired. In some implementations, the locks 417 are electronic and may be actuated by pressing a button or flipping a switch. The locks 417 may also be automatic, such that they are unlocked when actuation of the vehicle is measured, such as by vehicle sensors.

Figure 5B:
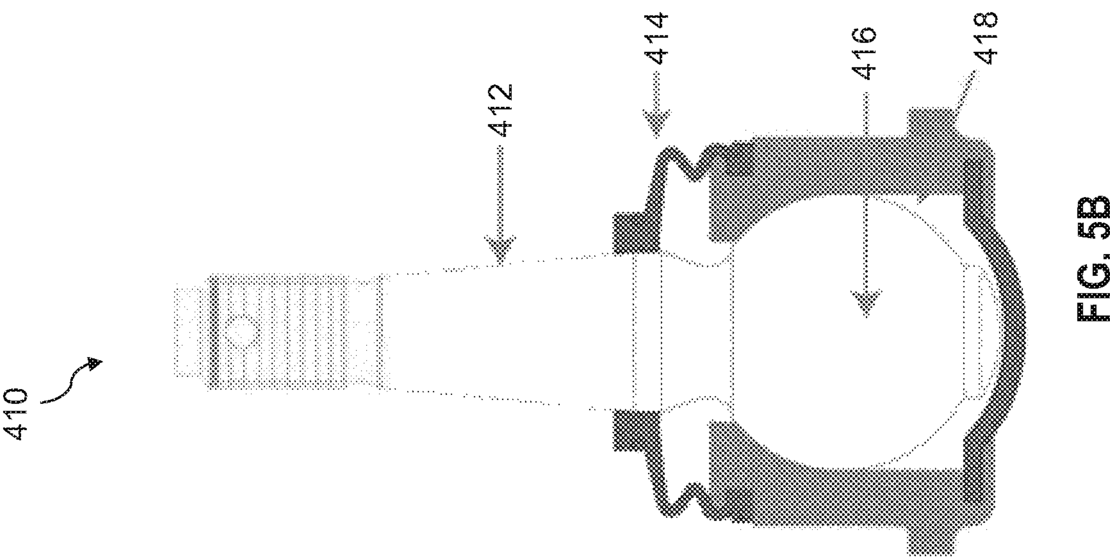
FIG. 5B is a cross-sectional diagram illustrating a ball joint according to embodiments of the present invention.
Figure 5A:
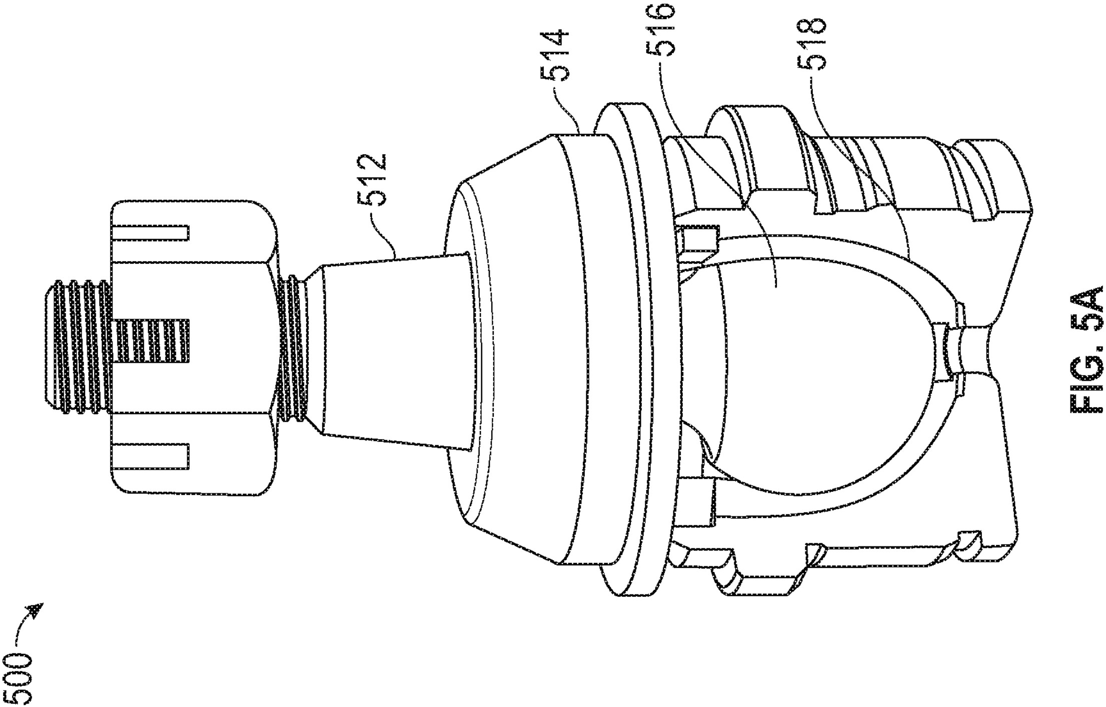
FIG. 5A is a diagram illustrating a ball joint according to embodiments of the present invention.
Figure 6:
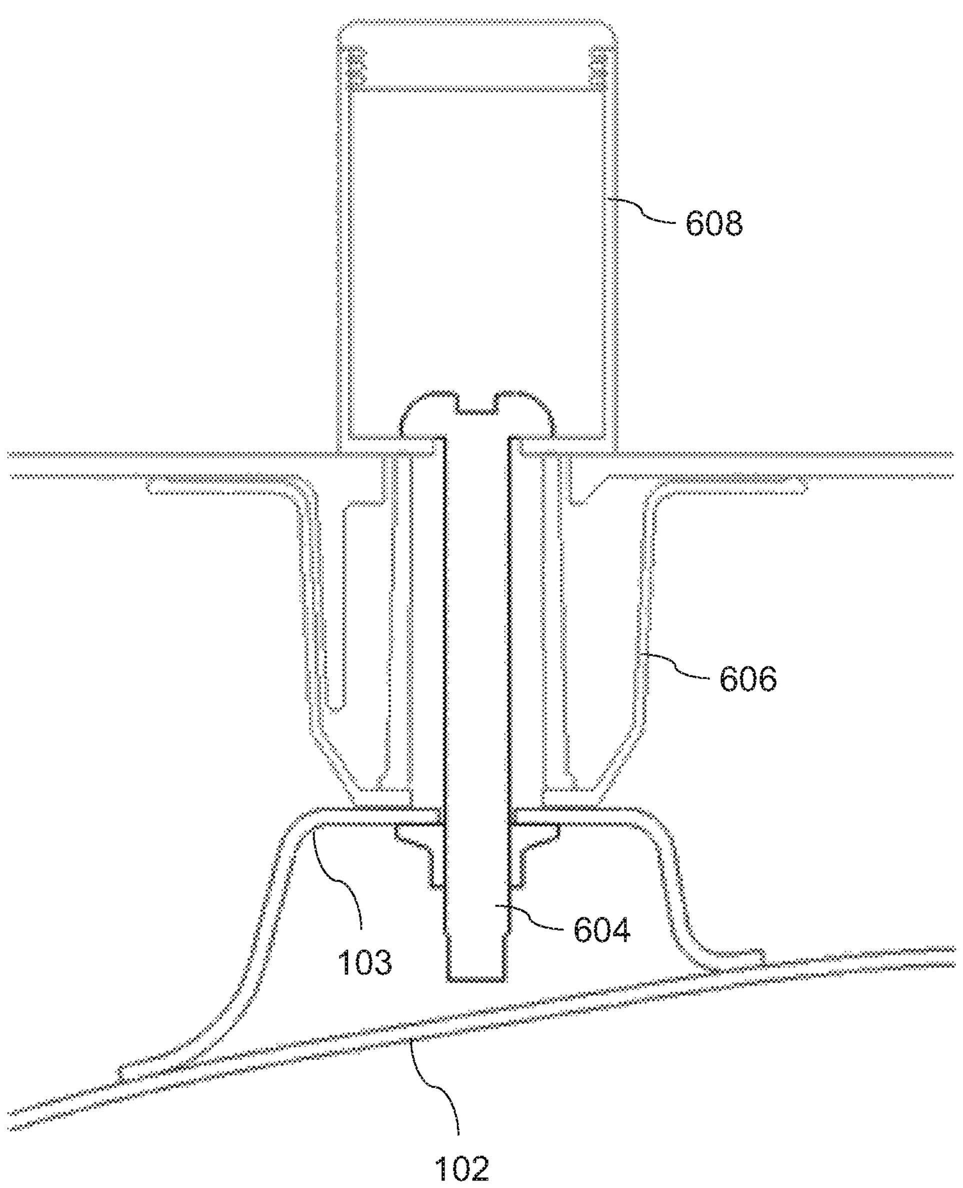
FIG. 6 is a diagram illustrating a mount of the cargo mounting system according to embodiments of the present invention.

FIGS. 5A and 5B show further internal and external details of the ball joint 410, 500, including the tapered stud 412, 512, boot 414, 514, socket 418, 518, and ball 416, 516. The threaded insert 522 is also shown with corresponding threads 421. FIG. 6 shows a diagram of a mount 600 which is similar to the mounts 214 shown in FIGS. 2 and 3. The mount 600 may rigidly attach the cargo mounting system 200 to a vehicle. In some implementations, the mount 600 attaches to the bed 102 of a vehicle. The mount 600 may also attached to other components of the vehicle, such as to the roof, a roof rack or other cargo rack, or directly to the frame of the vehicle. The example of FIG. 6, the mount 600 may include a bolt 604 which passes through a base structure 606 and into a frame mount 103, bracket, or rib of the vehicle. The bolt 604 may be threaded and may include a head which may be positioned within an upper portion 608 of the mount which may be used to protect the bolt 604. In some implementations, the upper portion 608 is configured for mounting a spare tire.

Figure 7:
FIG. 7 is a flowchart illustrating a method for attaching a cargo mounting system to a vehicle according to embodiments of the present disclosure.
Figure 7:
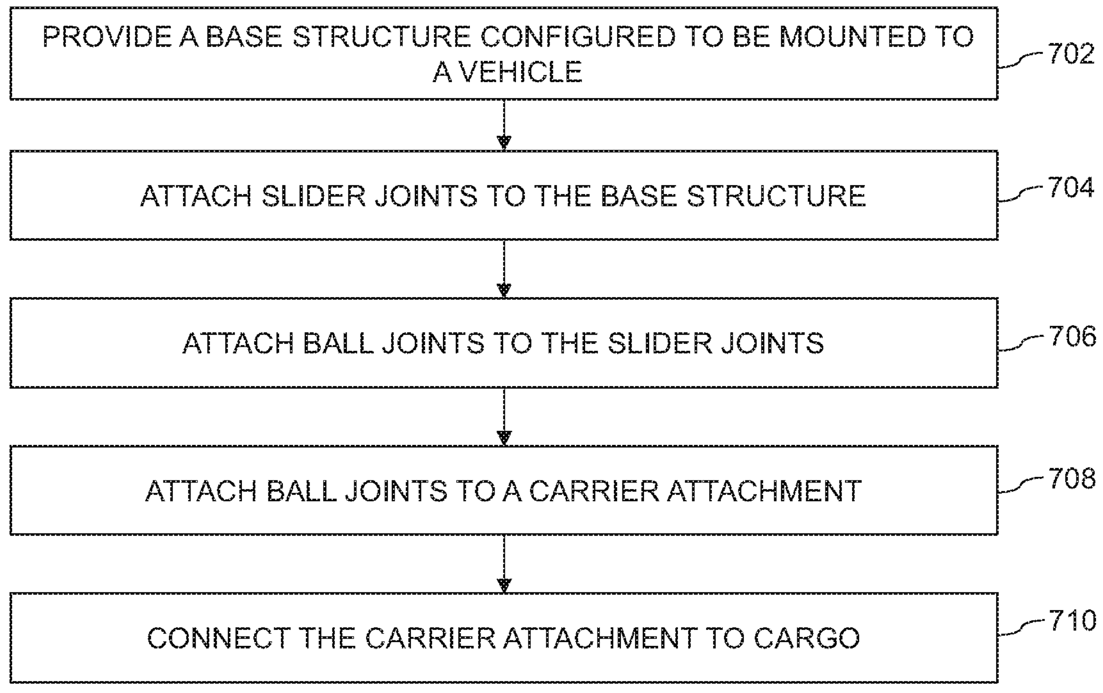

FIG. 7 shows a method 700 for attaching a cargo mounting system (such as the cargo mounting system 200 shown in FIGS. 2-3) to a vehicle. The method 700 may include block 702 to provide a base structure configured to be mounted to the vehicle. This base structure may be rigidly mounted to the vehicle, as shown in FIGS. 2, 3, and 6.

In block 704, the method 700 may include providing slider type joints, such as slider joints 216, 420 shown in FIGS. 2-4. These slider type joints may be included in the cargo mounting system, such as between the base structure and internal rails. The slider type joints may allow movement in only one direction.

In block 706, the method 700 may include providing ball joints, such as ball joints 218, 410, 500 shown in FIGS. 2-5B. These ball joints may be included in the cargo mounting system, such as between the base structure and internal rails. In some implementations, the ball joints 218 are attached directly to slider-type joints. The ball joints may allow movement in all directions within a limited angular area.

In block 708, the method 700 may include attaching joints to a mounting structure, such as mounting structure 202 shown in FIGS. 2-3. The joints may be attached to the mounting structure via internal rails. The mounting structure may be configured to carry cargo such as a spare tire, supplies, tools, provisions, or other equipment.

In block 710, the method 700 may include mounting cargo on the mounting structure. This block 710 may include bolting, strapping, or otherwise securing the cargo to the mounting structure. In this way, the cargo is securely carried on the cargo mounting system without inhibiting the movement or articulation of the vehicle.

The foregoing outlines features of several implementations so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the implementations introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A mounting system for a vehicle, comprising:
- a base structure configured to be mounted rigidly to the vehicle, the base structure comprising a first rail and a second rail;
- a first slider joint disposed on the first rail;
- a second slider joint disposed on the second rail;
- a first ball joint disposed on the first slider joint;
- a second ball joint disposed on the second slider joint;
- a third rail extending between and in contact with both the first ball joint and the second ball joint; and
- a mounting structure disposed on the third rail, the mounting structure configured to carry cargo.

2. The mounting system of claim 1, further comprising a third slider joint disposed on the first rail and a fourth slider joint disposed on the second rail.

3. The mounting system of claim 2, further comprising a third ball joint disposed on the third slider joint and a fourth ball joint disposed on the fourth slider joint.

4. The mounting system of claim 3, further comprising a fourth rail extending between and in contact with both the third ball joint and the fourth ball joint, wherein the mounting structure is disposed on the fourth rail.

5. The mounting system of claim 1, wherein the third rail is positioned substantially perpendicular to the first rail and the second rail.

6. The mounting system of claim 4, wherein the fourth rail is positioned substantially perpendicular to the first rail and the second rail.

7. The mounting system of claim 1, wherein the cargo is a spare tire.

8. The mounting system of claim 1, wherein the base structure is configured to be mounted to a bed of the vehicle.

9. The mounting system of claim 1, further comprising a lock disposed on the first slider joint, the lock configured to inhibit movement of the slider joint when actuated.

10. A cargo mounting device for a vehicle, comprising:
- a first support rail with a first end and a second end configured to be mounted to a bed of the vehicle;
- a second support rail with a first end and a second end configured to be mounted to the bed of the vehicle;
- a third support rail extending between the first support rail and the second support rail;
- a fourth support rail extending between the first support rail and the second support rail;
- a first joint structure disposed on a proximal end of the third support rail and connected to the first support rail;
- a second joint structure disposed on a distal end of the third support rail and connected to the second support rail;
- a third joint structure disposed on a proximal end of the fourth support rail and connected to the first support rail;
- a fourth joint structure disposed on a distal end of the fourth support rail and connected to the second support rail; and
- and a mounting structure configured to carry cargo, the mounting structure extending between the third support rail and the fourth support rail,
- wherein each of the first, second, third, and fourth joint structures comprises a sliding joint connected to a ball joint.

11. The cargo mounting device of claim 10, wherein the mounting structure is configured to carry a spare tire.

12. The cargo mounting device of claim 10, wherein the mounting structure is connected to a central portion of the third support rail and a central portion of the fourth support rail.

13. The cargo mounting device of claim 10, wherein the mounting structure is rigidly attached to the third support rail and the fourth support rail.

14. The cargo mounting device of claim 10, further comprising a first, second, third, and fourth lock disposed on the first, second, third, and fourth joint structures, respectively, wherein the first, second, third and fourth locks are configured to inhibit movement of the first, second, third, and fourth joint structures when actuated.

15. A method of installing a mounting structure on a vehicle, comprising:
- providing a base structure comprising a first rail and a second rail;
- providing a first slider joint and a second slider joint disposed on the first rail;
- providing a first ball joint disposed on the first slider joint and a second ball joint disposed on the second slider joint;
- providing a third rail extending between and in contact with both the first ball joint and the second ball joint;
- providing a mounting structure disposed on the third rail;
- rigidly mounting the base structure to a vehicle bed; and
- mounting cargo on the mounting structure.

16. The method of claim 15, wherein the cargo is a spare tire.

17. The method of claim 15, further comprising rigidly mounting the base structure to the vehicle bed at the opposite ends of the first and second rails.

18. The method of claim 15, further comprising mounting the cargo on a central portion of the mounting structure.

19. The method of claim 15, wherein the mounting structure is rigidly mounted to a central portion of the third rail.

* * * * *